United States Patent
Imai

[11] 3,878,683
[45] Apr. 22, 1975

[54] METHOD OF COOLING SUBSTANCE OR GENERATING POWER BY USE OF LIQUEFIED GAS

[76] Inventor: Kenji Imai, No. 801, No. 5 Morinomiya Kodanjutaku No. 2 Morimachi, Joto-ku, Osaka, Japan

[22] Filed: Aug. 4, 1972

[21] Appl. No.: 277,989

[30] Foreign Application Priority Data
July 1, 1969 Japan.............................. 44-52326
July 8, 1969 Japan.............................. 44-54398
Feb. 26, 1971 Japan.............................. 46-9722
Feb. 26, 1971 Japan.............................. 46-9723

[52] U.S. Cl. .................. 60/647; 60/651; 62/53
[51] Int. Cl. .................. F01k 25/00; F17c 7/02
[58] Field of Search .......... 60/647, 651, 671; 62/52, 62/53

[56] References Cited
UNITED STATES PATENTS
| | | | |
|---|---|---|---|
| 2,301,404 | 11/1942 | Holmes | 60/36 |
| 3,068,659 | 12/1962 | Marshall, Jr. | 62/53 X |
| 3,237,403 | 3/1966 | Feher | 60/36 |
| 3,266,261 | 8/1966 | Anderson | 62/52 |
| 3,287,901 | 11/1966 | Taver | 60/36 |
| 3,312,063 | 4/1967 | Anderson | 60/36 |
| 3,315,466 | 4/1967 | Anderson | 60/36 |
| 3,325,992 | 6/1967 | Sheldon | 60/39.18 B |
| 3,376,706 | 4/1968 | Angelino | 60/647 |
| 3,451,342 | 6/1969 | Schwartzman | 60/36 X |
| 3,583,156 | 6/1971 | Schabert et al. | 60/36 |

OTHER PUBLICATIONS
Thermodynamics, by John Keenan; John Wiley & Sons, New York 1949. Pgs. 62-64

Primary Examiner—Martin P. Schwadron
Assistant Examiner—Allen M. Ostrager
Attorney, Agent, or Firm—Armstrong, Nikaido & Wegner

[57] ABSTRACT

A method of cooling a substance or convert heat energy into mechanical energy by circulating a liquefied gas in a closed cycle and subjecting the gas to heat exchange during the circulation with heat energy of another substance. No power supply from outside in the cooling operation and fuels, like petroleum and coal for obtaining power are necessary.

16 Claims, 2 Drawing Figures

METHOD OF COOLING SUBSTANCE OR GENERATING POWER BY USE OF LIQUEFIED GAS

BACKGROUND OF THE INVENTION

This invention relates generally to a method of cooling a substance or a method of generating power by converting heat energy into mechanical energy, and more particularly to a method of producing mechanical or electrical power or a cooling effect by converting heat energy into mechanical energy, said heat energy being obtained by using a liquefied gas as a working substance, circulating the gas in a closed cycle and making a heat exchange during the circulation with a medium containing heat energy of low utility existing in nature or the heat energy of a special substance to be cooled.

In conventional cooling systems in which power is used, it is a general practice to compress a cooling medium gas holding heat energy in a closed state, said heat energy being taken from a substance to be cooled by supplying a cooling system with power from outside, and in liquefying a high-pressure and high-temperature cooling medium gas thus compressed, to throw away ultimately the heat energy the gas holds in the atmosphere by use of an air cooling or liquid cooling heat exchanger. Thus, the conventional cooling systems, in wasting heating energy, are very uneconomical.

Further, in conventional power generation methods, either fuel such as petroleum, coal, etc. is used or energy through nuclear fission of atom is used, and accordingly, they involve not only increased cost and large apparatus but also make it necessary to take careful consideration of the environmental disrupture attendant upon the possible production of poisonous materials.

SUMMARY OF THE INVENTION

A primary object of this invention therefore is to provide a cooling method capable of supplying the power necessary for cooling a substance to be cooled by not discarding, in its unused state, the heat energy a cooling medium takes from a to-be-cooled substance in cooling but using the power generated by the conversion of the heat energy into mechanical energy.

Another object of the invention is to provide a cooling method and a power generation method which enable said cooling and power generation at the same time in one cycle of circulation.

Still another object of the invention is to provide a method of generating power by the use of such heat energy of low efficiency as is held by natural objects such as the atmosphere, sea water and such heat energy as is discarded from chimneys and cooling systems, etc., of a factory, power plant, ship, etc.

According to one embodiment of the invention, the aforementioned disadvantages of the prior art are overcome by a method for cooling a fluid medium comprising disposing a liquefied gas in a closed container at a temperature and pressure less than the critical temperature and pressure of said gas; heating said liquefied gas to the critical temperature and above the critical pressure; regulating the pressure of said gas to a specified value higher than the critical pressure but less than that detrimental to the equipment involved; subjecting said gas to heat exchange with a heated medium in a heat exchanger thereby heating said gas and cooling said heated medium; adiabatically expanding said gas in a means for transmitting said expansion into mechanical energy to reduce the temperature of said gas below the critical temperature; using at least a portion of the power generated by said means to effect the flow of all fluids in the process; liquefying said gas and returning the liquefied gas to said closed container. Preferably, said liquefied gas has a critical temperature below 40°C. The liquefying step can occur solely due to the temperature drop of the adiabatically expanded gas. Optionally, said gas can be liquefied by being compressed to its critical pressure and thereafter cooled by heat exchange with the gas immediately after adiabatic expansion. Said heated medium can be either the cooled fluid medium or be heated in a second heat exchanger by said fluid medium.

A further embodiment provides for a method of power generation comprising disposing a liquefied gas in a closed container at a temperature and pressure less than the critical temperature and pressure of said gas; heating said liquefied gas to the critical temperature and above the critical pressure; regulating the pressure of said gas to a specified value higher than the critical pressure but less than that detrimental to the equipment involved; subjecting said gas to heat exchange in a heat exchanger with a medium containing heat energy from a natural medium or a man-made medium of low utility, thereby heating said gas and cooling said medium; adiabatically expanding said gas in a means for transmitting said expansion into mechanical energy to reduce the temperature of said gas below the critical temperature; using at least a portion of the power generated by said means to effect the flow of all fluids in the process; liquefying said gas and returning the liquefied gas to said closed container. Said liquefied gas preferably has a critical temperature below 200°C. The liquefying step can occur solely due to the temperature drop of the adiabatically expanded gas or by compressing the gas to its critical pressure and thereafter cooling the same by heat exchange with the gas immediately after adiabatic expansion. Said medium can be a preselected fluid medium to be cooled or be heated in a second heat exchanger by a preselected fluid medium to be cooled. Said means for transmitting said expansion into mechanical energy is preferably a turbine or piston engine. Said medium advantageously is or contains heat energy from the atmosphere or sea water. Optionally, said medium is or contains heat energy from the gaseous or liquid effluent of a factory, power plant, ship or a cooling system. Said gas is most suitably heated in said heat exchanger to a temperature higher than its critical temperature.

BRIEF DESCRIPTION OF THE DRAWING

These and other objects, features and advantages of the invention will become more apparent from a detailed explanation of the invention taken in conjunction with the accompanying drawing wherein.

DETAILED DESCRIPTION

Figure 2:
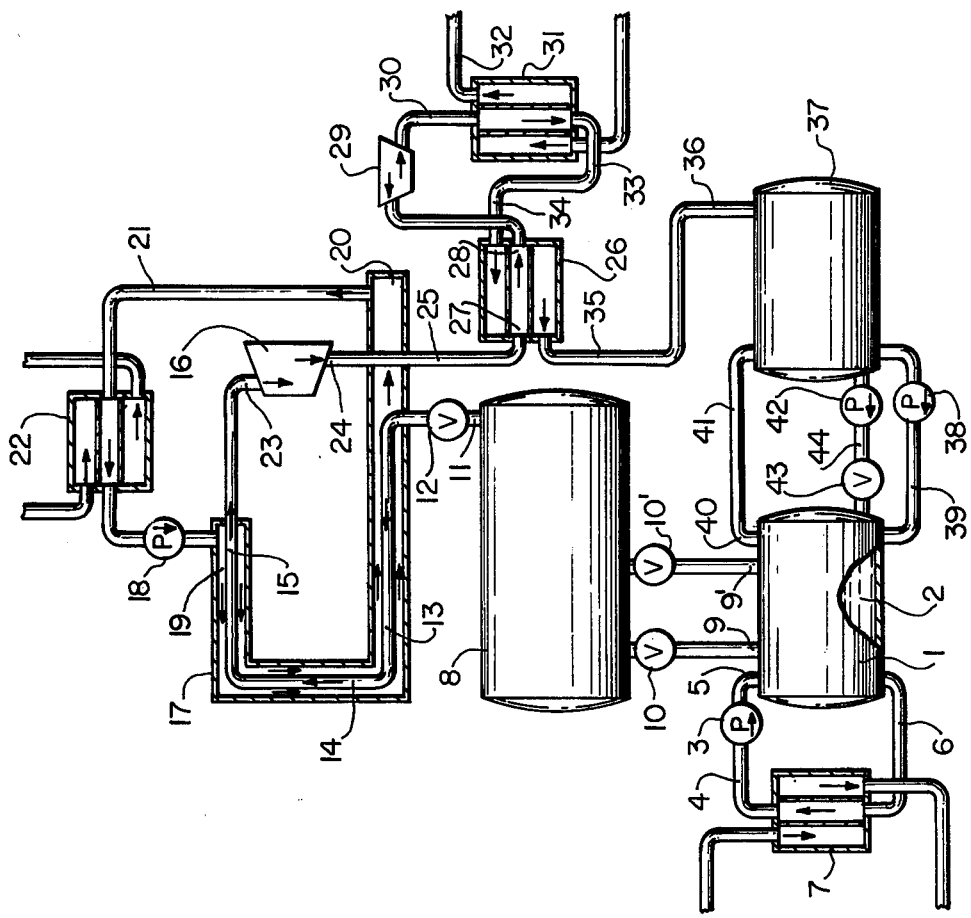
FIG. 2 is a schematic system diagram showing another embodiment of the invention.
Figure 1:
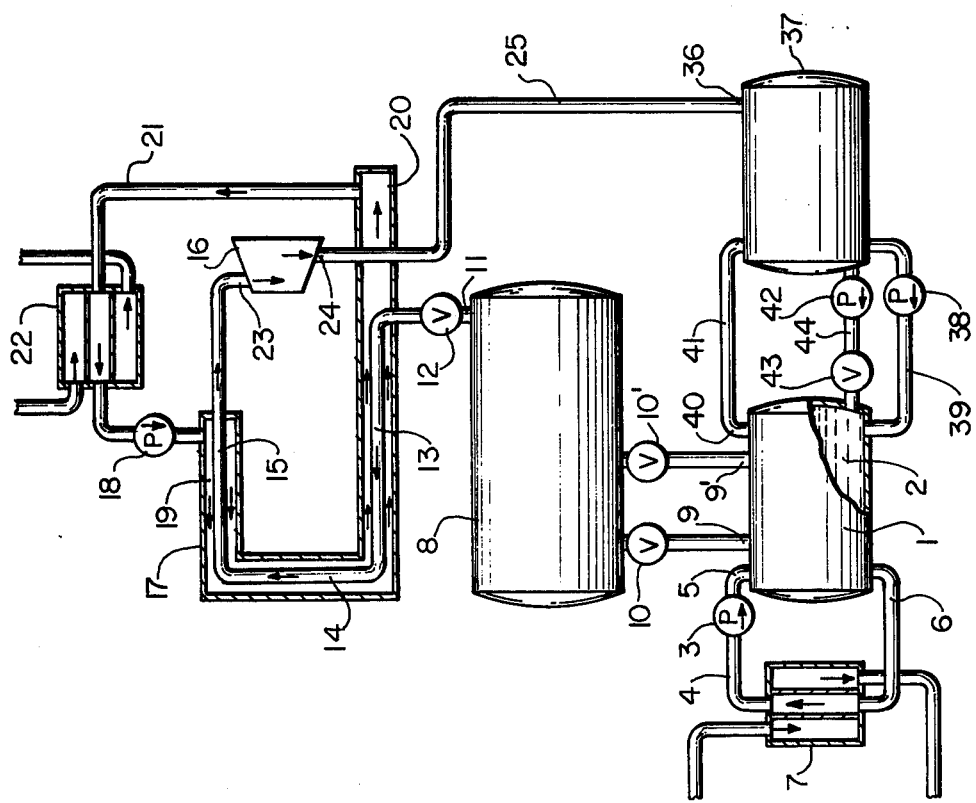
FIG. 1 is a schematic system diagram showing one embodiment of the invention.

The cooling and power generation methods of the invention are carried out simultaneously in either of the systems of FIGS. 1 and 2. The embodiments of FIG. 1 and FIG. 2 are different from each other only in that the former is designed to function by liquefying the working substance adiabatically expanded in the turbine solely by the temperature drop of the substance itself, while the latter positively effects liquefaction through the agency of a heat exchanger and compressor.

In carrying out the cooling operation of the invention, the cooling medium as well as the other aspects of the cooling operation may vary depending upon various conditions such as the intended cooling temperature, scale of operation, place of operation, etc. However, for illustrative purposes, the embodiments of FIGS. 1 and 2 will be described in detail hereinafter.

In FIG. 1, numeral 1 designates a closed high-pressure container which holds a liquid cooling medium. Container 1 is heavily insulated to substantially eliminate heat transfer from the outside except at designated, illustrated heat exchange regions. One heat region includes pipes 4, 5 and 6 for transmitting a heat energy medium through or by a part of container 1. Accordingly, when the heat energy medium is circulated by the operation of pump or fan 3 through pipes 4, 5 and 6, the heat energy medium absorbs heat energy from a high-temperature outside medium in heat exchanger 7, emitting the absorbed heat energy into the interior of closed high-pressure container 1 thereby heating the liquid cooling medium contained therein. Container 1 is provided with a further heat exchange region including pipes 39, 40 and 41 circulating the liquefied cooling medium in tank 37 between container 1 and tank 37 to cool the contents of the closed container 1. Pump 38 is disposed in an intermediate portion of pipe 38 to generate the motive force for circulation.

Container 1 is provided with exhaust ports 9 and 9' which lead to pressure regulating tank 8 via valves 10 and 10' disposed intermediately therebetween. Valves 10 and 10' are opened to permit the passage of the resultant vaporized cooling medium to high-pressure tank 8 when the liquefied cooling medium held in container 1 is elevated to its critical temperature and vapor pressure and is on the verge of developing at once a great pressure. Numeral 8 designates a high-pressure tank for regulating the pressure of the cooling medium vaporized in container 1. When it is desirable to reduce the size of or dispense with tank 8, pipes 13, 14 and 15 leading from tank 8 must be sufficiently large in capacity to take over part or all of the pressure regulating function formerly assumed by tank 8.

Numeral 17 designates a heat exchanger for further heating the vaporized cooling medium on its passage to turbine 16. When valve 12, disposed in the high-pressure tank 8 is opened, the vaporized cooling medium in tank 8 is fed through pipes 13, 14 and 15 wherein it is subjected to heat exchange with a heated medium that has previously absorbed heat energy from a medium to be cooled in heat exchanger 22. Pump or fan 18 disposed preferably in heat exchanger 17, drives the heated medium through pipes 19, 20 and 21 for heat exchanger 22. Thus, heat exchangers 17 and 22 serve a two-fold purpose, i.e., the to-be-cooled medium is cooled while the vaporized cooling medium is heated. The increase in temperature of the vaporized cooling medium can be suitably controlled by controlling the flow of the heated medium by means of pump or fan 18. Heat exchanger 22 may be dispensed with when it is desired that the to-be-cooled medium be cooled directly by the vaporized cooling medium in heat exchanger 17.

The vaporized cooling medium, having received heat energy in heat exchanger 17, is then adiabatically expanded and cooled in turbine 16 transforming the heat energy directly into mechanical energy. Turbine 16 is necessarily insulated from heat transfer from the outside. The vaporized cooling medium that has been adiabatically expanded in the turbine 16 is liquefied by the temperature drop of the medium itself, and collected in tank 37 through pipes 25 and 36. (Tank 37 is also insulated from heat transfer from the outside.) In addition to the heat exchange connection via pipes 39, 40 and 41 (previously discussed) tank 37 is connected to container 1 by pipe 44 through which the liquefied cooling medium is fed by pump 42 that starts when valve 43 is opened.

It is to be noted that, since container 1, tank 8 and tank 37 must all resist high pressure, it may be desirable under certain circumstances to make an assemblage of pipes function as the respective tanks.

A preferred embodiment of the invention in which cooling is effected by the use of the system of FIG. 1 will be described hereinafter. Although as previously indicated, the cooling medium as well as the other aspects of the cooling operation may vary depending upon circumstances, for illustrative purposes, the following embodiment contemplates an intended cooling temperature on the order of minus 140°C, a medium scale cooling operation and the installation of the cooling system on stable ground. Nitrogen is selected as the cooling medium.

Referring to FIG. 1, when closed high-pressure container 1 has been filled with liquid nitrogen ($N_2$) and thereafter subjected to the heat energy resulting from circulating a heat energy medium through pipes 4, 5 and 6 by pump or fan 3, the liquid nitrogen in container 1 is heated and gradually increased both in temperature and pressure. As the temperature rises toward minus 147°C, the critical temperature of nitrogen, the vapor pressure of nitrogen is progressively being raised to about 33.5 atm., its critical pressure. Thereafter, the pressure tends to rise immediately to such high pressures as about 800 atm. To prevent this possibility, container 1 is provided with exhaust ports 9 and 9' leading to high-pressure tank 8 for regulating pressure. Ports 9 and 9' are formed at the respective front ends with valves 10 and 10' which open when the pressure in container 1 exceeds 270 atm. to permit the passage of the resultant nitrogen gas from container 1 into tank 8 thereby regulating pressure. When the pressure inside container 1 is reduced to the order of 270 atm., valves 10 and 10' close exhaust ports 9 and 9' again. When the operation of pump 3 and thus the heating of container 1 are terminated, the nitrogen gas left in the container 1 maintains a temperature of about minus 147° C and pressure of about 270 atm.

High-pressure tank 8 for regulating pressure is filled beforehand with nitrogen gas on the order of minus 145°C in temperature and 200 atm. in pressure. The nitrogen gas subsequently emitted from container 1 to high-pressure tank 8 raises the pressure inside tank 8 to more than 200 atm. at which point previously closed valve 12 opens exhaust port 11 to feed nitrogen gas to turbine 16 via pipes 13, 14 and 15. Heat exchanger 17 disposed along pipes 13, 14 and 15 effects a heat transfer from a heated medium, at a temperature of more than minus 100°C to the nitrogen gas. The heated medium was previously raised to this temperature by absorbing heat energy from a substance to be cooled in heat exchanger 22. By regulating the flow rates of the heated medium and the substance to be cooled, the nitrogen gas, having a temperature of −145°C when entering heat exchanger 17, cools the substance to be cooled to the order of minus 140°C. The flow rates are further advantageously regulated so that the temperature of the nitrogen gas leaving heat exchanger 17 and entering turbine 16 is about minus 100°C, the pressure remaining at about 200 atm. If turbine 16 is filled beforehand with nitrogen gas and subsequently driven at an exhaust pressure of about 34 atm., a part of the heat energy of the nitrogen gas is converted by the turbine into mechanical energy, through a process conversion to "Position Energy of Molecule." The nitrogen gas is resultantly greatly reduced in temperature and pressure. Since the turbine 16 is well insulated, the temperature of the nitrogen gas falls ideally in accordance with the following equation, the γ-value of nitrogen gas being approximately 1.4:

$$T_2 = T_1 \left(\frac{P_2}{P_1}\right)^{(\gamma - 1 / \gamma)}$$

The temperature of the nitrogen gas after having been adiabatically expanded in the turbine is calculated by this equation to be on the order of minus 169°C. However, in practice, the temperature is slightly higher due to the generation of frictional heat and other causes. As far as possible, the temperature should be maintained on the order of minus 169°C by minimizing factors causing temperature elevation.

The nitrogen gas having done its work in turbine 16 is liquefied by the temperature drop of the gas itself and is collected in tank 37 through pipes 25 and 36. Tank 37 is provided with pump 38 for circulating the liquid nitrogen collected in tank 37 through container 1 via pipes 39, 40 and 41, to cool in heat-exchange fashion the nitrogen gas in container 1 (from about 270 atm. in pressure about minus 147°C) and liquefy a part thereof until the vapor pressure and temperature of the liquefied nitrogen become equal to those of the liquid nitrogen in tank 37. When the liquid nitrogen collected in tank 37 becomes sufficient in quantity to fill container 1, valve 43 is opened to operate pump 42 to feed the liquid nitrogen from tank 37 through pipe 44 into container 1 until the latter is filled. At this point, valve 43 is closed and pumps 38 and 42 are stopped. Thus, the operation cycle of the method of the invention can then be repeated by heating the liquid nitrogen in the container as previously described.

As shown in the embodiment illustrated above, the system according to the method of the invention requires power necessary for operating pumps or fans 3, 18, 38, 42 for circulating gas and liquid. Advantageously, this power can be obtained from power generated in the turbine 16. Thus, except for the heat energy of high temperature heat exchange mediums as discussed, there is no need of supplying power or energy from the outside to operating the system. In the cooling system according to the method of this invention, the cooling effect in the heat exchanger 7, in addition to that of heat exchangers 17 and 22 as set forth previously, may be used for useful cooling purposes. Further, under certain circumstances, it may be more desirable to use a piston engine or the like, rather than or in addition to a turbine, as an engine for generating power by adiabatically expanding a high-pressure vaporized cooling medium. Still further, it may be more desirable to dispense with high-pressure container 1 by directly containing high-pressure regulating tank 8 via a pipe or the like to the tank 37 where liquefied nitrogen is collected and by forcing the liquefied nitrogen continuously or intermittently into tank 8. The description above indicates a preferred embodiment of the invention, but it is apparent that various modifications and changes could be made in the invention by those skilled in the art without departing from the scope and spirit of the invention.

While the embodiment of FIG. 1 relies upon the temperature drop of the adiabatically expanded medium to liquify the same, the embodiment of FIG. 2 facilitates liquefication by interposing heat exchangers 26 and 31 together with compressor 29 between pipes 25 and 36. When the vaporized cooling medium, that has fallen in temperature after having been adiabatically expanded in the turbine 16, reaches heat exchanger 26 and passes through pipes 27 and 28, the cooling medium receives heat energy from countercurrent cooling medium passing through pipes 34 and 35, heated to atmospheric temperature as described hereinafter. Compressor 29, intended to maintain the exhaust pressure of the turbine 16 at a specified pressure, then raises the pressure of the thus-heated vaporized cooling medium which has fallen in turbine 16 to the neighborhood of the critical pressure. Heat exchanger 31, communicating with compressor 29 via pipe 30, is designed to decrease the temperature of the compressed vaporized cooling medium by subjecting the same to heat exchange with cooling water or air of an atmospheric temperature flowing through pipes 32 and 31. The parameters of the heat exchange process are designed such that the temperature of the cooling medium leaving heat exchanger 31 by means of pipe 33 is substantially atmospheric. The vaporized cooling medium, cooled to an atmospheric temperature, is subsequently subjected to heat exchange in countercurrent fashion in the heat exchanger 26 with the incoming cooling medium to be thereby liquefied and collected in the tank 37 after traversing pipe 36. Referring to the nitrogen gas, discussed previously with respect to FIG. 1, the gas having done its work in turbine 16, is led to compressor 29 through pipes 25, 27 and 28, being compressed there to about 33.5 atm., its critical pressure. The nitrogen gas has been not only heated to an atmospheric temperature in the heat exchanger 26 but raised to an even higher temperature by being compressed by compressor 29. As the nitrogen gas makes a heat exchange with cooling water passing through pipe 32 in heat exchanger 31, the temperature thereof is reduced to atmospheric with its pressure maintained on the order of 33.5 atm. After traversing pipes 33 and 34, the nitrogen gas passes through heat exchanger 26, being cooled in the process by heat exchange with the low-temperature nitrogen gas flowing in pipes 27 and 28. Resultantly, the nitrogen gas leaving via pipe 35 is reduced to a temperature of minus 160°C. Since nitrogen gas cannot maintain a pressure of 33.5 atm. at the temperature of minus 160°C, the gas partly liquefies and tends to maintain a vapor pressure on the order of 18 atm. that corresponds to a temperature of minus 160°C. But as nitrogen gas emits heat of condensation upon liquefying, the nitrogen gas of minus 160°C that comes thereafter is elevated in temperature by the heat of condensation, so that the temperature of liquefaction gradually becomes higher as does the vapor pressure of the liquefied nitrogen. As the vapor pressure approaches 33.5 atm., the critical pressure, the emission of heat of condensation per unit mass decreases. Consequently the amount of heat energy absorbed by the nitrogen gas of minus 160°C that successively comes thereafter and the amount of heat of condensation emitted by the nitrogen that is being liquefied are balanced with each other in the neighborhood of about 31 atm. pressure and about minus 148°C, both below the critical limits. Nitrogen liquefied in this manner is collected in tank 37 through pipe 36.

As described above, the system illustrated in FIG. 2 is more effective in liquefaction than that illustrated in FIG. 1.

Now, the inventive method of generating power by use of the systems shown in FIGS. 1 and 2 will be described. Since a description of elements that constitute said systems coincides with the description so far made, no further discussion thereof will be presented.

As previously set forth, an object of this invention is to generate mechanical power and/or electric power by using heat energy of low utility such as that held by the atmosphere, sea water, etc., and heat energy wasted from chimneys and cooling systems of factories, power plants, ships, etc. Accordingly, the working substance to be used should be a substance having a critical temperature lower than a temperature of heat source of the substance to be used, namely a temperature of about minus 50° to minus 40°C in the case of the atmosphere, about 0° to 40°C in the case of sea water and about 50° to 200°C in the case of chimneys and cooling systems. Accordingly, when a substance higher than 200°C in critical temperature becomes higher than 200°C, it becomes unfitted to that extent for a substance for the generation of power by the method of the invention. Everythingelse being equal, the use of a substance higher in $\gamma$-value ($C_p/C_v$) is more advantageous than the use of a substance smaller in value $\gamma$-value. Necessarily, the higher the $\gamma$-value, the greater the work effect of the adiabatically expanded substance.

Based on the above conditions, the following embodiment relies upon the use of methane as the working substance and the atmosphere as the heat source. In FIGS. 1 and 2, when heat energy taken from the outside air in heat exchanger 7 is fed to boiler 1 by operating pump 3 to circulate a heat energy medium through pipes 4, 5 and 6, after boiler 1 has been filled with liquefied methane gas 2, the liquefied methane gas inside is heated and gradually elevated both in temperature and vapor pressure toward 45.8 atm. and minus 82.1°C, the critical pressure and temperature, respectively. When the temperature thus elevated is about to exceed the critical temperature of methane, the vapor pressure suddenly tends to be raised at once to a high pressure such as about 580 atm. Valves 10 and 10' of ports 9 and 9' limit this increase by opening to permit the passage of methane gas from boiler 1 to high-pressure tank 8, when the pressure in boiler 1 exceeds 280 atm. After about one half of the methane gas that was vaporized in the boiler 1 has been emitted, the pressure in the boiler 1 drops to about 280 atm., consequently closing valves 10 and 10'. On the other hand, pump 3 then stops operation thereby terminating the heating of boiler 1 to leave the residual methane gas in boiler 1 about minus 82.1°C in temperature and about 280 atm. in pressure.

Pressure regulating high-pressure tank 8 has beforehand been filled with methane gas at about minus 80°C in temperature and about 200 atm. in pressure. The methane gas that emitted from boiler 1 to high-pressure tank 8 would raise the pressure inside tank 8 to more than 200 atm., but for valve 12 which, when the pressure in the tank exceeds 200 atm, opens exhaust port 11. Accordingly, the methane gas in tank 8 is fed to a turbine 16 through pipes 13, 14 and 15. Heat exchanger 17 disposed along the pipes and transmits heat energy to the methane gas from the outside air by means of heat exchanger 22 and an intermediary heat energy medium flowing through pipes 19, 20 and 21 and pump 18. The heat exchange operation is regulated to yield a methane gas temperature of minus 30°C at the turbine inlet in pipe 23. Turbine 16 having beforehand been filled with methane gas, is driven at an exhaust of about 46 atm. Thus, a part of the heat energy held by the methane gas (200 atm. and minus 30° C at the inlet of turbine 16) is converted by the turbine into mechanical energy and carried away, and the methane gas itself as the working substance is greatly reduced in both temperature and pressure. Since turbine 16 is well insulated, the ideal temperature drop of the methane gas is described by formula previously set forth, the value of $\gamma$ of methane gas being approximately 1.4. The calculated temperature of the gas (after having being expanded in the turbine) is about minus 120°C. In practice, however, the temperature is somewhat higher because of the generation of frictional heat inside the turbine and other causes. By supressing factors elevating the temperature, the temperature can be maintained at about minus 110°C.

However, as it is impossible for the methane gas to maintain 46 atm. at a temperature of minus 110°C, part of the gas is liquefied and inclined to maintain a vapor pressure of about 19 atm. corresponding to minus 110°C. But, when methane gas is liquefied, it emits a heat of condensation, so that methane gas having a temperature of minus 110°C and which comes in thereafter is elevated in temperature. Consequently, the temperature at which liquefaction of the methane gas is effected gradually increases to raise the vapor pressure of the liquefied gas. As the vapor pressure approaches 45.8 atm., the critical pressure, the emission of the heat of condensation per unit mass decreases until the quantity of heat energy absorbed by methane gas at minus 110°C coming in thereafter and the quantity of heat of condensation emitted by the methane gas being liquefied are balanced both in temperature and pressure at a level somewhat lower than the critical temperature and critical pressure, namely at a temperature of about minus 83°C and a vapor pressure of about 43 atm. corresponding to the temperature.

The methane gas liquefied in this manner is collected in tank 37 through pipe 36. Pump 38, disposed in tank 37, circulates the methane collected in tank 37 via pipes 39, 40 and 41 to cool and liquefy the methane gas of about 280 atm. and about minus 82.1°C left in the boiler 1. When the liquefied gas becomes equal in vapor pressure and temperature to the liquefied methane in tank 37 and the latter has collected in an amount sufficient to fill boiler 1, valve 43 is opened and pump 42 operates to feed the liquefied methane gas to boiler 1 through pipe 44. Upon filling boiler 1, valve 43 is closed to stop the operation of pumps 38 and 42, and pump 3 is actuated to circulate the heat energy medium through pipes 4, 5 and 6 thereby heating the liquefied methane in boiler 1. Thus, the cycle of operation described above is repeated.

The total power necessary for operating the power generating device according to the method of the invention, such as power for operating pumps 3, 18, 38 and 42 and compressor 29, and for feeding air to heat exchangers 7 and 22, etc. is smaller than the power generated in turbine 16. The difference between the two becomes effective power generated in the system of turbine 16 and capable of being fed to other systems.

In the embodiment described and illustrated, the work of boiler 1 is to vaporize the liquefied working substance and to supply the working substance thus vaporized to pressure regulating high-pressure tank 8. Instead, under certain conditions it may be more desirable to dispense with boiler 1 by directly connecting pressure regulating high-pressure tank 8 to tank 37 via pipes so as to feed the liquefied working substance continuously or intermittently and to carry out the vaporization operation in pressure regulating high-pressure tank 8.

Although the above description is directed to a preferred embodiment of the invention, it is apparent that the invention could be modified in various ways by those skilled in the art without departing from the scope and spirit thereof.

The cooling method of the invention makes it possible to reduce the cost of cooling since the method converts the heat energy taken from a to-be-cooled substance which energy has been heretofore in the atmosphere, into mechanical energy to produce the power necessary for the operation of the system thereby making it possible to dispense with an outside supply of power. When a cooling system in accordance with the method of the invention is used in conjunction with engines for a ship, land vehicle or the like, all of the power generated in the engines of the same can be diverted into propellent force without a portion of the power thus generated being required in the operation of the cooling system.

Alsi, the method of this invention concerning the generation of power makes it possible to depend upon the atmosphere and sea water for a source of supply of the heat energy to be used. Therefore, the method can be used all over the earth. Effective use of the method can be made even in high mountains, Siberia in winter, northern regions of Canada, or the artic and antarctic regions where the atmospheric temperature is low by suitably selecting other substances, which are low in critical temperature, than methane, such as for example carbon monoxide, oxygen, nitrogen, air, etc. and using each of them as a working substance. Also, as there is no need of burning fuel, the method can be used even in the underground and under the sea where the supply of oxygen and air is difficult so long as a source of heat energy is available.

Furthermore, the generation of power according to the method of the invention is not only different from that of the other methods in which petroleum, coal or nuclear fission is used, but is free from the production of harmful substances causing "environmental disruption." In addition, the heat energy used is either heat energy, continuously supplied by the sun to the earth, or that discarded in the atmosphere because of difficulty or lack of utility. Accordingly, the heat energy to be used in the invention threatens no diminution of resources. On the contrary, the method of the invention makes it possible to reduce the consumption of petroleum, coal, and natural gas now used in large amounts as fuels thereby allowing these limited resources to be better allocated as raw materials for organic compound products having other useful applications.

While several embodiments of the invention have been shown and described, other variations will be readily apparent to those skilled in the art. Therefore, the invention is not limited to these embodiments but is intended to cover all such variations as may be within the scope of the invention defined by the following claims:

I claim:
1. A method for cooling a fluid medium comprising
   a. disposing a liquefied gas in a closed container at a temperature and pressure less than the critical temperature and pressure of said gas;
   b. heating said liquefied gas to the critical temperature and above the critical pressure;
   c. regulating the pressure of said gas to a specified value higher than the critical pressure but less than that detrimental to the equipment involved;
   d. subjecting said gas to heat exchange with another heated medium in a heat exchanger thereby heating said gas and cooling said heated medium;
   e. adiabatically expanding said gas in a means for transforming said expansion into mechanical energy to reduce the temperature of said gas below the critical temperature;
   f. using at least a portion of the power generated by said means to effect the flow of all fluids in the process;
   g. liquefying said gas and
   h. returning the liquefied gas to said closed container.
2. A method according to claim 1 wherein said liquefied gas has a critical temperature below 40°C.
3. A method according to claim 1 wherein the liquefying step occurs solely due to the temperature drop of the adiabatically expanded gas.
4. A method according to claim 1 wherein said gas is liquefied by being compressed to its critical pressure and thereafter cooled by heat exchange with the gas immediately after adiabatic expansion.
5. A method according to claim 1 wherein said heated medium is said cooled fluid medium.
6. A method according to claim 1 wherein said heated medium is heated in a second heat exchanger by said fluid medium.
7. A method for power generation comprising
   a. disposing a liquefied gas in a closed container at a temperature and pressure less than the critical temperature and pressure of said gas;
   b. heating said liquefied gas to the critical temperature and above the critical pressure;
   c. regulating the pressure of said gas to a specified value higher than the critical pressure but less than that detrimental to the equipment involved;
   d. subjecting said gas to heat exchange in a heat exchanger with another medium containing heat energy from a natural medium or a man-made medium of low utility, thereby heating said gas and cooling said medium;

e. adiabatically expanding said gas in a means for transforming said expansion into mechanical energy to reduce the temperature of said gas below the critical temperature;

f. using at least a portion of the power generated by said means to effect the flow of all fluids in the process;

g. liquefying said gas and h. returning the liquefied gas to said closed container.

8. A method according to claim 7 wherein said liquefied gas has a critical temperature below 200°C.

9. A method according to claim 7 wherein the liquefying step occurs solely due to the temperature drop of the adiabatically expanded gas.

10. A method according to claim 7 wherein said gas is liquefied by being compressed to its critical pressure and thereafter cooled by heat exchange with the gas immediately after adiabatic expansion.

11. A method according to claim 7 wherein said medium is a preselected fluid medium to be cooled.

12. A method according to claim 7 wherein said medium is heated in a second heat exchanger by a preselected fluid medium to be cooled.

13. A method according to claim 7 wherein said means for transmitting said expansion into mechanical energy in a turbine or piston engine.

14. A method according to claim 7 wherein said medium is or contains heat energy from the atmosphere or sea water.

15. A method according to claim 7 wherein said medium is or contains heat energy from the gaseous or liquid effluent of a factory, power plant, ship or a cooling system.

16. A method according to claim 7 wherein said gas is heated in said heat exchanger to a temperature higher than its critical temperature.

* * * * *